United States Patent [19]
Fussnegger et al.

[11] Patent Number: 5,383,592
[45] Date of Patent: Jan. 24, 1995

[54] SHEET-STEEL COMPONENT AND LIGHT SHEET METAL COMPONENT WELDED JOINT

[75] Inventors: Wolfgang Fussnegger, Rohrau; Harald Brinkschroeder, Nebringen, both of Germany

[73] Assignee: Mercedes-Benz AG, Germany

[21] Appl. No.: 162,399

[22] Filed: Dec. 6, 1993

[30] Foreign Application Priority Data

Dec. 4, 1992 [DE] Germany .............................. 4240822

[51] Int. Cl.⁶ ............................................. B23K 31/02
[52] U.S. Cl. ................................... 228/135; 228/175; 228/262.44; 29/509; 219/118; 403/271
[58] Field of Search ........... 228/135, 175, 182, 262.44; 29/509; 219/117.1, 118; 403/271

[56] References Cited

U.S. PATENT DOCUMENTS

| | | | |
|---|---|---|---|
| 2,566,871 | 9/1951 | Bedford et al. | 296/154 |
| 4,753,364 | 6/1988 | Stoffel et al. | 220/658 |

FOREIGN PATENT DOCUMENTS

| | | |
|---|---|---|
| 803442 | 9/1936 | France . |
| 2759897 | 11/1982 | Germany . |
| 3038824 | 12/1982 | Germany . |
| 3813860 | 11/1989 | Germany . |
| 4240823 | 10/1993 | Germany . |
| 964743 | 7/1964 | United Kingdom . |

OTHER PUBLICATIONS

Machine Design, vol. 58, No. 27, Nov. 13, 1986, pp. 56–62.

*Primary Examiner*—Samuel M. Heinrich
*Attorney, Agent, or Firm*—Evenson, McKeown, Edwards & Lenahan

[57] ABSTRACT

A joint between a sheet-steel component and a sheet-aluminum component is welded by a lap or web weld with the aid of an additional part connected to the sheet-aluminum component at the rim and welded to the sheet-steel component. To make the welding of covering panels manufactured from aluminum to frame parts manufactured from steel sheet simpler and cheaper in production, the additional part is manufactured exclusively from an iron material and lock-seamed to the rim of the sheet-aluminum component.

8 Claims, 1 Drawing Sheet

SHEET-STEEL COMPONENT AND LIGHT SHEET METAL COMPONENT WELDED JOINT

BACKGROUND AND SUMMARY OF THE INVENTION

The present invention relates to a welded joint between a sheet-steel component and a light sheet metal component, in particular a sheet-aluminum component, by way of a lap or web weld with the aid of an additional part connected to the light sheet metal component at the rim and welded to the sheet-steel component.

An article "Resistance spot-welding of aluminum to steel" in the German periodical Schweißen und Schneiden 34, 1982, volume 1, pp 15–20 discusses an electrically resistance-welded joint between a steel sheet and a light metal sheet in which the two sheets overlap at the rim. Welding is carried out with the aid of a bimetallic composite material consisting of a roll-bonded intermediate sheet which, viewed along its wall thickness, consists of about 50% steel and about 50% aluminum. For welding, the two sheets are overlapped and the intermediate sheet manufactured from the composite material is arranged between them in the overlapping region. In this arrangement, the steel side of the intermediate sheet faces the steel sheet and the light-metal side faces the aluminum sheet. In this process, the sequence of operations is likewise complex since for each welding operation the intermediate sheet has to be inserted. This method of joining parts in a visible area is furthermore unfavorable since, due to the intermediate sheet, the overlap edge is very high and a large amount of effort is required to clean the overlap edge.

U.S. Pat. No. 2,566,871 shows a motor-vehicle door having a frame manufactured from aluminum and being clad with formed steel parts. As depicted in FIG. 9 of this patent, an additional part manufactured from steel is rivetted to the frame part. A steel bracket is welded to the other end of the additional part. For reasons of weight, motor vehicle manufacturers are increasingly producing large, and hence also heavy, cladding parts from light metal. However, the techniques described are unsuitable for aluminum covering panels which are arranged on a steel frame because it relates to the attachment of small steel parts to light-metal frame parts. During the production of the door, the additional part must furthermore be rivetted to the light-metal part in a defined position and the bracket welded on in a defined position. Due to the positionally accurate attachment of the additional part, this method of attachment is very time-consuming and costly.

German Patent 3,038,824 discloses the welding of a steel sheet to a light metal sheet arranged in abutting relationship, and an additional part is placed against the rear of the butt joint between the sheets. The additional part is manufactured from light metal and is clad with steel in the region of the steel sheet placed thereagainst. For welding, the additional part is placed with its clad region against the steel sheet and with the light-metal region against the light metal sheet and is then welded to the respective sheet by electric resistance welding. Since the two sheets are butt-welded, only a small amount of cleaning work is necessary on the visible side of the joint. It is advantageous that, with this joining method, it is also possible to dispense with other expensive joining devices such as rivets, screws etc. However, the sequence of work in the welding process is complex since for each weld an additional part must be inserted.

An object of the present invention is to further improve the welded joint such that a sheet-aluminum component and a sheet-steel component can be joined more simply in production.

That object has been achieved according to the present invention in that the additional part consists of an iron material and is lock-seamed to the rim of the light sheet metal component and the additional part is bonded to the light sheet metal component. By virtue of the positive-locking arrangement of the rim of the sheet-aluminum component in the seam of the additional part which is manufactured from iron material before fitting to and welding to the sheet-steel component, a sheet-aluminum component prepared in this way can be placed against and welded to the sheet-steel component in a simple manner.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
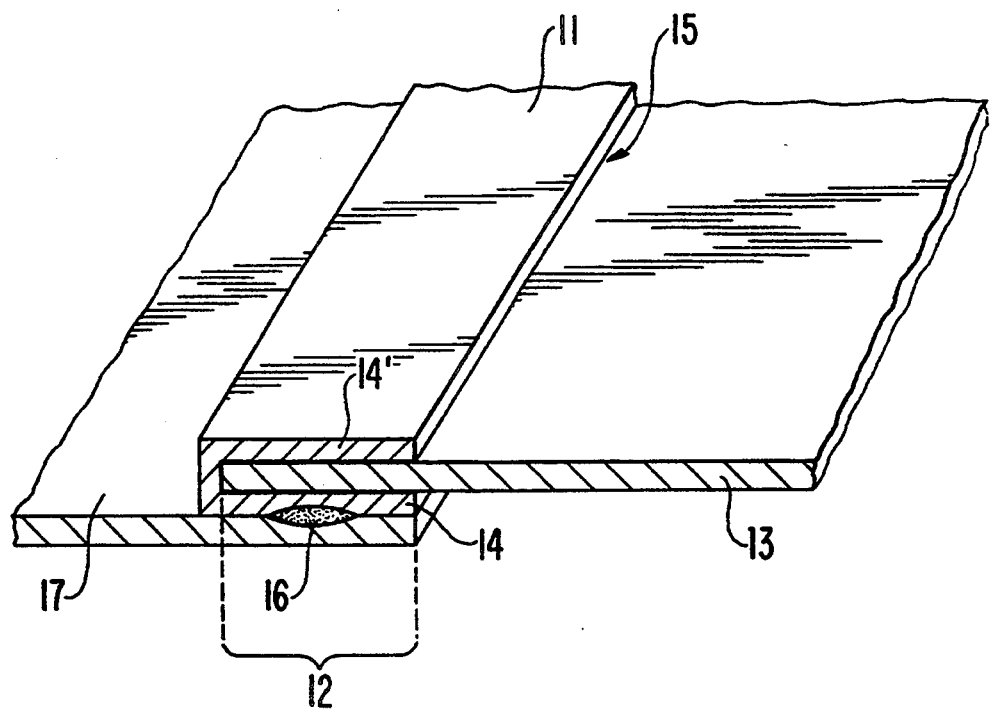
FIG. 1 is a perspective view of a welded joint between a sheet-steel component and a sheet-aluminum component with an extended rim of the sheet-aluminum component inserted into an additional part.

FIG. 1 shows a welded joint between a sheet-steel component 17 and an overlapping sheet aluminum component 13 by way of a weld 16. Since aluminum can be welded to steel only with difficulty, if at all, welding is effected with the aid of an additional part 11 made of iron material which is arranged on the rim 12 of the sheet-aluminum component 13 and is welded to the sheet-steel component 17 by electric resistance welding. This welding operation can also advantageously be carried out by a laser beam. The additional part 11 has a region of U-shaped cross-section with legs 14, 14' of approximately equal length, and the extended rim 12 of the sheet-aluminum component 13 is inserted into the open side 15 of the profile of the additional part 11 and enclosed by the legs 14, 14' of the U-shaped region.

Within the open profile of the additional part 11, the rim 12 of the sheet-aluminum component 13 is bonded to the additional part 11. In the region of the weld 16, the sheet-steel component 17 and the additional part 11 overlap each other by approximately the depth of the profile of the additional part 11 which is welded to the sheet-steel component 17 at the leg 14 of the additional part 11 resting against the sheet-steel component 17. This weld can also be a conventional spot weld. This embodiment is more suitable especially for concealed covering parts and is less suitable for parts which are to be arranged in view due to the high overlap edge in the region of the weld.

Figure 2:
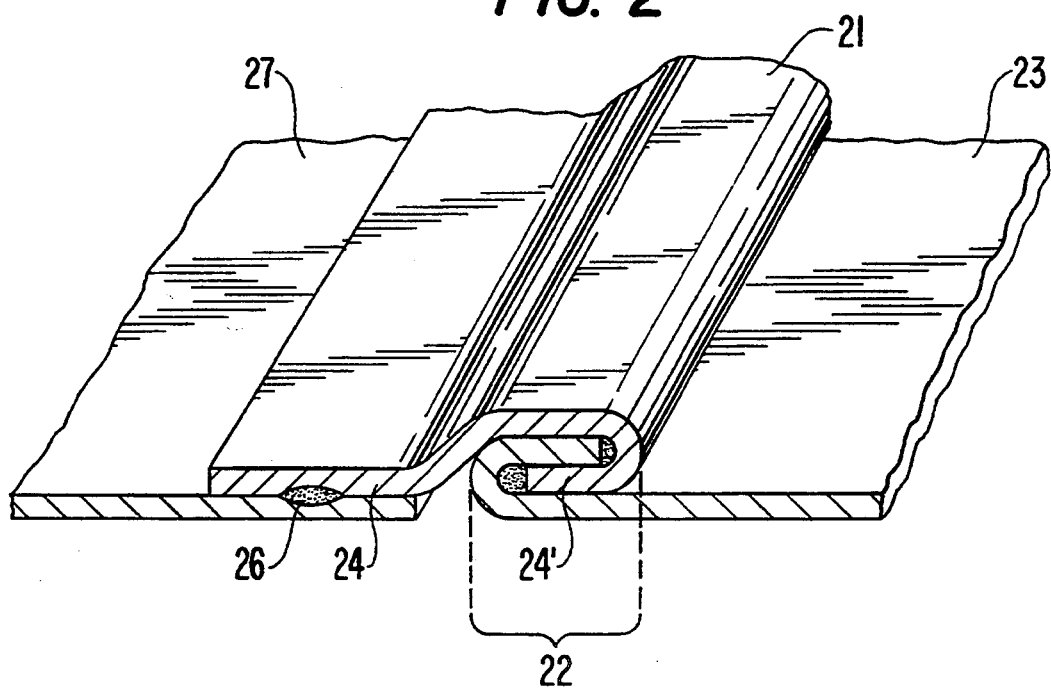
FIG. 2 is a perspective view of another embodiment of a welded joint between a sheet-steel component and a sheet-aluminum component with an additional part seamed to the rim of the sheet-aluminum component.

FIG. 2 shows a further embodiment of a welded joint between a sheet-steel component 27 and a sheet-aluminum component 23, and is more suitable for welds in visible areas. The additional part 21 is lock-seamed to the rim 22 of the sheet-aluminum component 23 and bonded within the seam to the sheet-aluminum component 23. Since the additional part 21 projects outwardly in a flange-like manner from the rim 22 of the sheet-aluminum component 23, the flat sides of the sheet-aluminum component 23 and of the sheet-steel component 27 which are within view can be arranged approximately in one plane. As a result, the transition from the sheet-aluminum component 23 to the sheet-steel component 27 requires only a small amount of cleaning work. In order to achieve this, the additional part 21 is configured as a profiled part of U-shaped cross-section, one leg 24 of which is longer than the other leg 24'. The rim 22 of the sheet-aluminum component 23 is likewise of U-shaped cross-section.

To secure the additional part 21 on the rim of the sheet-aluminum component 23, the two U-shaped cross-sections of the additional part 21 and of the sheet-aluminum component 23 are hooked into one another, with the shorter leg 24' of the additional part 21 engaging in the rim 22, which is bent into a U-shape, of the sheet-aluminum component 23. The additional part 21 now projecting into the bent rim 22 of the sheet-aluminum component 23 is seamed and bonded along its short limb 24' to the rim 22 of the sheet-aluminum component 23. Because the one leg 24 of the additional part 21 is longer than the leg 24', it projects in the flange-like manner beyond the rim 22 of the sheet-aluminum component 23 and is welded to the latter at the sheet-steel component 27 by the weld 26. The lower Limit for the length of the long leg 24 of the additional part 21 has proved to be one and a half times the length of the shorter leg 24' to guarantee accessibility for the welding electrodes.

In general, the sheet-aluminum components 13, 23 do not have to be provided with the additional part 11, 21 along their entire rims 12, 22. In some cases, it may be quite sufficient to provide the rims 12, 22 with an additional part 11, 21 in only certain areas and to weld it to the latter at the sheet-steel component 17, 27 in the manner of a spot weld.

A preferred area of application for the present invention is the welding of large covering panels made of aluminum or other light materials such as magnesium alloys, plastics or the like to steel load-bearing frame parts of a motor-vehicle body since this is associated with large savings in weight on the overall welded component. Aluminum-sheet covering panels prepared according to the invention, with an additional part made of an iron material arranged on the rim can furthermore be welded together in a simple, conventional and inexpensive manner by the conventional electric resistance welding methods widespread in motor-vehicle construction, the welded joint being capable of bearing high loads. It is furthermore advantageous that the additional part can in general be produced cheaply as a profiled strip.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A welded joint between a sheet-steel component and a light sheet metal component, such as a sheet-aluminum component, comprising a lap or web weld and an additional part connected to the light sheet metal component at a rim of the light sheet metal component and welded to the sheet-steel component, wherein the additional part consists of an iron material and is lock-seamed to the rim of the light sheet metal component and the additional part is bonded to the light sheet metal component.

2. The welded joint according to claim 1, wherein the additional part projects outwardly from the rim of the light sheet metal component.

3. The welded joint according to claim i, wherein the additional part has a U-shaped cross-section region with legs of approximately equal length and an open side faces the light sheet metal component such that the rim of the light sheet metal component is enclosed by the legs of the U-shaped cross-section region.

4. The welded joint according to claim 1, wherein the sheet-steel component and the additional part overlap each other by approximately the depth of a profile of the additional part in a region of the weld, and a leg of the additional part is welded to the sheet-steel component.

5. The welded joint according to claim 1, wherein the additional part is a profiled part having a U-shaped cross-section, one leg of which is longer than the other leg, the rim of the light sheet metal component has a U-shaped cross-section, with the two U-shaped cross-sections of the additional part and of the light sheet metal component are hooked into one another and seamed together, and the longer leg of the additional part projects from the light sheet metal component and is welded to the sheet-steel component.

6. The welded joint according to claim 5, wherein the length of the longer leg of the additional part is equal to about one and a half times the length of the shorter leg.

7. The welded joint according to claim 1, wherein the additional part is welded to the sheet-steel component by an electric resistance weld.

8. The welded joint according to claim 1, wherein the additional part is welded to the sheet-steel component by a laser weld.

* * * * *